United States Patent
Klein

[19]

[11] Patent Number: 6,051,957
[45] Date of Patent: Apr. 18, 2000

[54] BATTERY PACK HAVING A STATE OF CHARGE INDICATOR

[75] Inventor: David N. Klein, Franklin, Mass.

[73] Assignee: Duracell Inc., Bethel, Conn.

[21] Appl. No.: 09/176,574

[22] Filed: Oct. 21, 1998

[51] Int. Cl.[7] .......................... H02N 7/00; G01N 27/416; G08B 21/00
[52] U.S. Cl. .......................... 320/132; 320/107; 320/112; 324/427; 340/636
[58] Field of Search .................................. 320/132, 134, 320/136, 107, 112; 324/427, 428; 340/636; 429/90–93

[56] References Cited

U.S. PATENT DOCUMENTS

| | | | |
|---|---|---|---|
| 1,497,388 | 6/1924 | Sterling . | |
| 2,980,754 | 4/1961 | Reilly et al. | 136/182 |
| 3,563,806 | 2/1971 | Hruden | 136/112 |
| 4,295,097 | 10/1981 | Thompson et al. | 324/429 |
| 4,323,849 | 4/1982 | Smith | 324/428 |
| 4,497,881 | 2/1985 | Bertolino | 429/91 |
| 4,515,873 | 5/1985 | DeHaan | 429/91 |
| 4,595,880 | 6/1986 | Patil | 324/427 |
| 4,679,000 | 7/1987 | Clark | 324/428 |
| 4,952,862 | 8/1990 | Biagetti et al. | 320/132 |
| 5,216,371 | 6/1993 | Nagai et al. | 324/428 |
| 5,244,754 | 9/1993 | Bohmer et al. | 429/91 |
| 5,250,905 | 10/1993 | Kuo et al. | 324/435 |
| 5,254,951 | 10/1993 | Goto et al. | 324/426 |
| 5,256,500 | 10/1993 | Ishimoto | 429/93 |
| 5,284,719 | 2/1994 | Landau et al. | 429/50 |
| 5,321,627 | 6/1994 | Reher | 364/483 |
| 5,339,024 | 8/1994 | Kuo et al. | 324/435 |
| 5,341,084 | 8/1994 | Gotoh et al. | 320/44 |
| 5,348,813 | 9/1994 | Bohmer et al. | 429/91 |
| 5,371,682 | 12/1994 | Levine et al. | 364/483 |
| 5,372,898 | 12/1994 | Atwater et al. | 429/90 |
| 5,396,177 | 3/1995 | Kuo et al. | 324/435 |
| 5,411,817 | 5/1995 | Ridgway et al. | 429/90 |
| 5,418,085 | 5/1995 | Huhndorff et al. | 429/91 |
| 5,418,086 | 5/1995 | Bailey | 429/93 |
| 5,460,902 | 10/1995 | Parker et al. | 429/90 |
| 5,518,835 | 5/1996 | Simmonds | 429/90 |
| 5,543,245 | 8/1996 | Andrieu et al. | 429/90 |
| 5,563,004 | 10/1996 | Buzzelli et al. | 429/27 |
| 5,572,110 | 11/1996 | Dunstan | 320/106 |
| 5,578,915 | 11/1996 | Crouch, Jr. et al. | 320/48 |
| 5,623,210 | 4/1997 | Sakamoto | 324/426 |
| 5,640,150 | 6/1997 | Atwater | 340/636 |
| 5,641,587 | 6/1997 | Mitchell et al. | 429/90 |
| 5,658,682 | 8/1997 | Usuda et al. | 429/92 |
| 5,710,501 | 1/1998 | van Phuoc et al. | 320/2 |
| 5,757,595 | 5/1998 | Ozawa et al. | 340/636 |

OTHER PUBLICATIONS

"Available Battery Time Sensor", Ferraiolo et al., IBM Technical Disclosure Bulletin, vol. 16, No. 5, Oct. 1973, pp. 1413–1414.

*Primary Examiner*—Adolf Deneke Berhane
*Assistant Examiner*—Gregory N. Toatley, Jr.
*Attorney, Agent, or Firm*—Fish & Richardson P.C.

[57] ABSTRACT

A battery pack for a portable electronic device includes a case for carrying a battery. The case supports a charge sensing circuit carried by the case, the charge sensing circuit producing a discharge signal corresponding to a measurement of an amount of charge removed from a battery. The case also supports a processor responsive to the discharge signal from the charge sensor circuit to produce a signal corresponding to an amount of time prior to discharge of the battery based on a current rate of discharge and a display responsive to the signal to display a time period corresponding to the amount of time to discharge the battery based upon the current rate of discharge of the battery.

20 Claims, 5 Drawing Sheets

BATTERY PACK HAVING A STATE OF CHARGE INDICATOR

BACKGROUND

This invention relates to batteries for portable devices such as computers, camcorders and cellular phones.

Batteries are used to power portable electronic equipment. Often batteries are used with equipment that give an indication of an amount of charge left in the battery. The charge indicator displays an indication of a percentage of useful power remaining compared to that the full charged battery. Sometimes these indicators are carried by the battery cell and are often of the chemical type. Sometimes the indicators are produced by circuits contained in the electronic device such as the cell phone or the like. When the indicator is produced by the device, the indicator is often a display such as an LCD display of a battery divided into segments. Each segment is lit or enabled to represent a percentage of power left in the battery. As power is drained from the battery segments are turned off with remaining lit ones indicating the remaining power in the battery.

SUMMARY

According to an aspect of the invention, a battery pack for a portable electronic device includes a case for carrying a battery. The case supports a charge sensing circuit carried by the case, the charge sensing circuit producing a discharge signal corresponding to a measurement of an amount of charge removed from a battery. The case also supports a processor responsive to the discharge signal from the charge sensor circuit to produce a signal corresponding to an amount of time prior to discharge of the battery based on a current rate of discharge and a display responsive to the signal to display a time period corresponding to the amount of time to discharge the battery based upon the current rate of discharge of the battery.

The battery pack can include a charge sensor circuit that measures the amount of charge removed from the battery. The sensor circuit can be a Coulomb counting circuit that counts an amount of charge units removed from the battery. The display can be a liquid crystal display, electrophoretic, or electronic ink display. The battery pack can carry at least one battery cell within the case. The processor is responsive to a charge signal and produces the signal corresponding to an amount of time prior to discharge based on the charge signal and a discharge signal from the charge sensor circuit. The processor produces a signal corresponding to a message that indicates a mode of operation of the battery and the message is displayed by the display. The message can correspond to an operation mode or a diagnostic mode.

According to another aspect of the invention, a battery pack for a portable electronic device includes a case carrying a battery, the case supporting a charge sensing circuit to produce an electrical signal corresponding to a measurement of an amount of charge removed from the battery and a processor responsive to the electrical signal from the charge sensor circuit to produce a signal corresponding to an amount of time prior to discharge of the battery in accordance with a history of operation of the battery. The battery pack also includes a display responsive to the signal indicating the amount of time prior to discharge, to display a time period corresponding to the amount of time to discharge the battery based upon a current mode of operation of the battery.

According to a still further aspect of the invention, a method of indicating time remaining to discharge a battery includes measuring and accumulating an amount of charge removed from the battery, determining the time remaining to discharge the battery from the amount of accumulated charge removed from the battery and from a current mode of operation of the battery and displaying a time period corresponding to the amount of time to discharge the battery.

According to a still further aspect of the invention, a method of indicating time remaining to charge a battery contained in a battery case includes measuring and accumulating an amount of charge inserted into the battery during charging of the battery and determining the time remaining to charge the battery from the amount of accumulated charge inserted into the battery. The method also includes displaying, on a display carried by the battery case, a time period corresponding to the amount of time to charge the battery.

One or more of the following advantages are provided by the invention. The display can have fields for displaying several status type messages. The processor can cause measurements of charge being removed from a rechargeable battery cell or being added to a rechargeable battery cell. These measurements are used to determine the amount of time that the battery cells have for discharging and charging. The time is calculated in accordance with the maximum capacity of the battery cells, and either the rate of charge or the rate of discharge of the battery cells in accordance with the mode of use, i.e., talk or a standby mode. This simplifies a user's estimate of the ability of the battery to last for a particular use before reaching discharge. Further, because the display is on the battery, its time to discharge can be ascertained by a user without having to attach the battery to a device such as a camcorder or cell phone.

DETAILED DESCRIPTION

Figure 1:
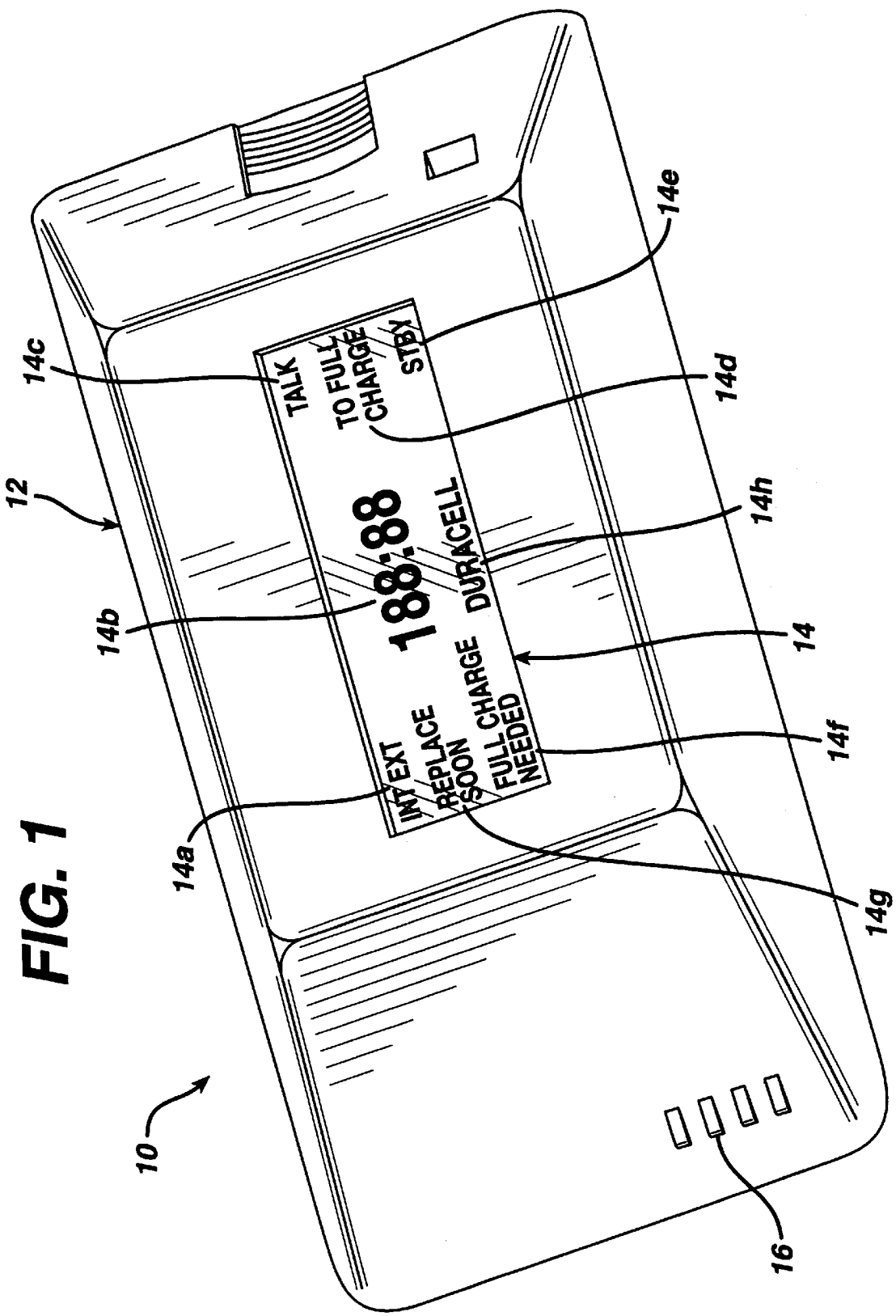
FIG. 1 is a perspective view of a battery pack carrying a display.

Referring now to FIG. 1, a battery pack 10 includes a case 12 carrying a display 14. The case 12 houses rechargeable battery cells, a controller (as will be described in conjunction with FIG. 2) and an electrical terminal 16 for connection to a user appliance such as a cellular telephone, video camcorder, etc. The case 12 can be configured to fit the user appliance. The case 12 carries the display 14. The display 14 includes a numeric message field which indicates, generally, in hours and minutes, the amount of time left to charge the battery, or to discharge the battery in accordance with the mode of operation of the battery. That is, the display will display a first time to discharge when the battery is in a use mode and a second time remaining to discharge when in a standby mode. These first and second times are determined in accordance with the capacity of the battery and the drain of charge from the battery depending on the mode. Alternatively, the display can display the time to charge the battery during charging operations.

The display 14 can have fields for displaying several status type messages. In particular, the display 14 can have a field that indicates the current mode of operation of the battery. For example, the "TALK" message 14c can be displayed on a battery used in cellular telephones and indicates that the battery is connected to a phone currently in use, whereas, the "STDY," message i.e., standby 14e, can be displayed when the battery is in a standby mode of operation. In addition, the battery can display messages such as "FULL CHARGE NEEDED" 14f, "REPLACE SOON" 14g and "INT EXT" 14a that can be used to indicate whether an internal or external charger in being used. The display 14 can display the time "TO FULL CHARGE", and so forth.

Figure 2:
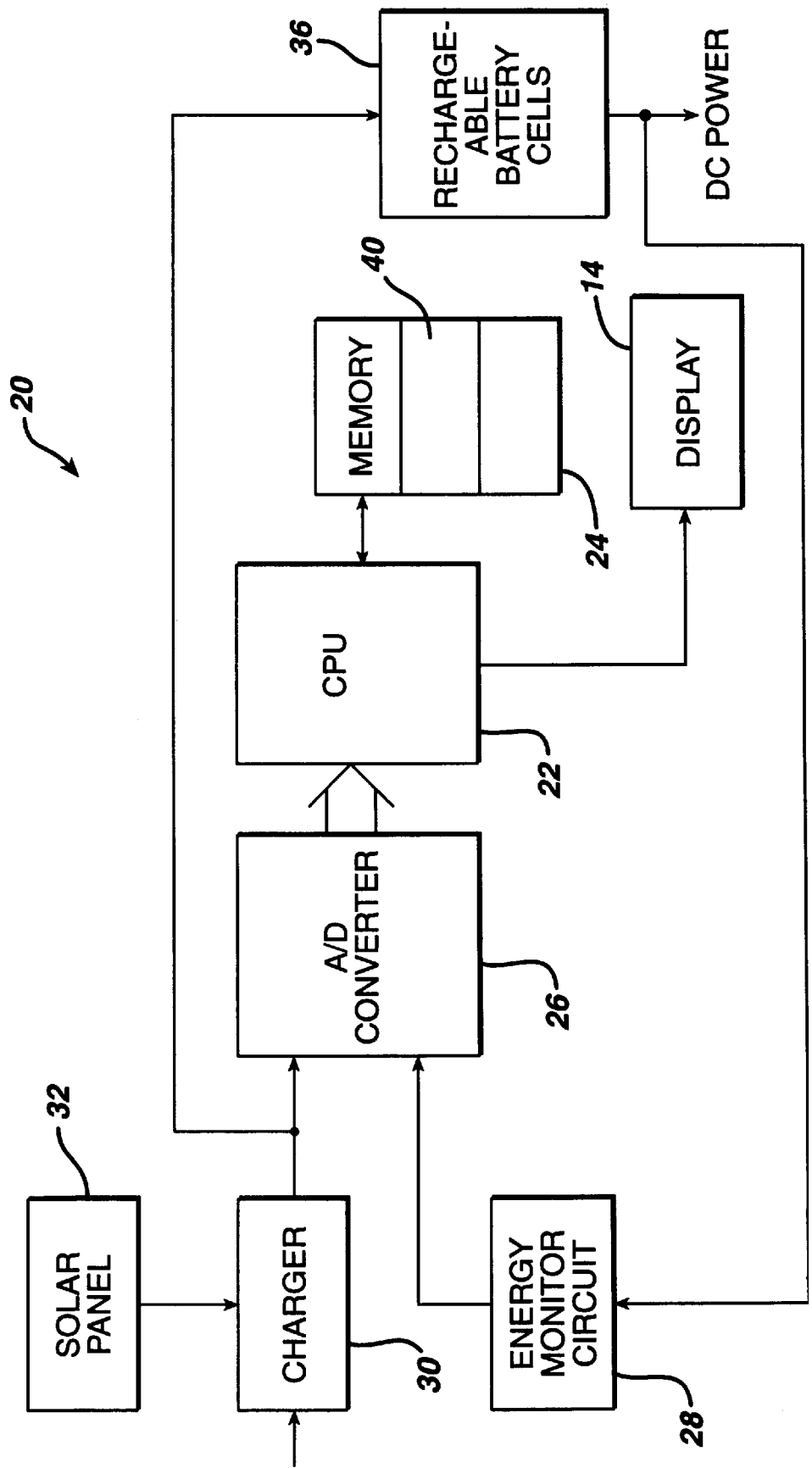
FIG. 2 is a block diagram of a microprocessor based controller to calculate a time based state of charge for cells in the battery pack of FIG. 1.

Referring now to FIG. 2, a microprocessor based controller 20 for generating signals to cause appropriate messages to be displayed on display 14 is shown. The microprocessor based controller 20 includes a processor 22 fed via a memory 24 having a computer program 40 in the form of software or firmware stored therein which controls operation of the processor 22 and permits the processor 22 to cause measurements of energy being removed from a rechargeable battery cell or being added to a rechargeable battery cell 36. These measurements are used to ascertain the amount of time that the battery cells have for discharging and charging in accordance with the maximum capacity of the battery cells, and either the rate of charge, or the rate of discharge of the battery cells in accordance with the mode or use, i.e., talk or a standby mode. Optionally, leakage of charge from the battery can also calculated. Charge leakage can be based on known or estimated leakage rates.

The processor controls an A/D converter 26 that provides data corresponding to measurements made of the state of the battery cells 36. The A/D converter 26 senses current fed to the battery cells via a charger 30 and also senses current drawn from the rechargeable battery cell via an energy monitor circuit 28. The energy monitoring circuit can operate using various known modes. A preferred mode is the so-called "Coulomb counting mode" in which charge that is removed from the battery is determined. Under control of the program 40, the A/D converter will sample these signals and feed these signals to the processor 22 to permit the processor to make the necessary measurements of these parameters. Optionally, the controller 20 as well as charging can be performed via a solar panel 32. Alternatively, the rechargeable battery cells 36 can supply current to the controller electronics 20.

Figure 3:
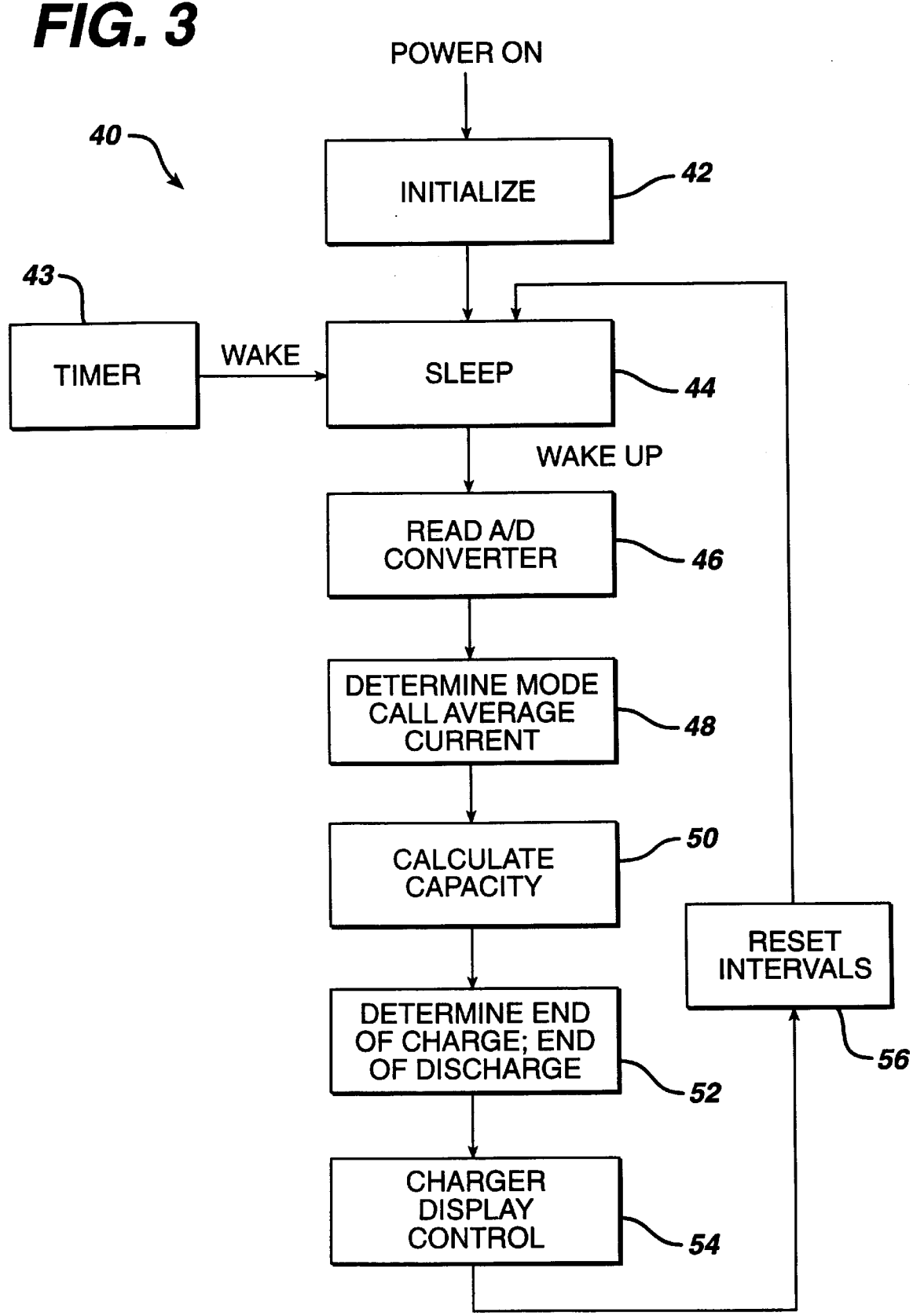
FIG. 3 is a flow chart showing a process for determining a state of charge.

Referring now to FIG. 3, a program 40 for providing a time state of charge display format for the display 14 is shown. The program 40 includes an initialization routine 42 which initializes various components in the controller 20, as needed. The controller 20 will enter a sleep mode 24 and will remain in that mode unless awakened by a timer signal 43 or some other event. For example, the program 40 can exit the sleep mode via an interrupt from the energy monitoring circuit or from software or hardware timers. Upon exiting the sleep mode, the program causes the processor to read 46 outputs from the analog-to-digital converter (26, FIG. 2). The A/D converter (26, FIG. 2) will be fed via the discharge current from the rechargeable battery cells 36 via the energy monitoring circuit 28, as well as, a charging current from the charger 30 depending upon the use of the battery.

The processor will determine the mode of operation 48 of the battery and call an average current routine that will calculate the average current being drawn from the battery over a period of time. Details on one approach for determining mode of operation are set out in FIG. 4. The processor will calculate 50 the remaining capacity of the battery (using a routine 80 FIG. 5, or equivalent) and will determine the end of charge and end of discharge states of the battery 36. The processor will calculate the time remaining to discharge or charge the battery in accordance with the mode of operation of the battery and produce signals that are used by a display control routine to enable the various messages 14a–14g on the display 14. Thereafter, the processor resets the operation and returns to a sleep mode 34 awaiting the next event.

Figure 4:
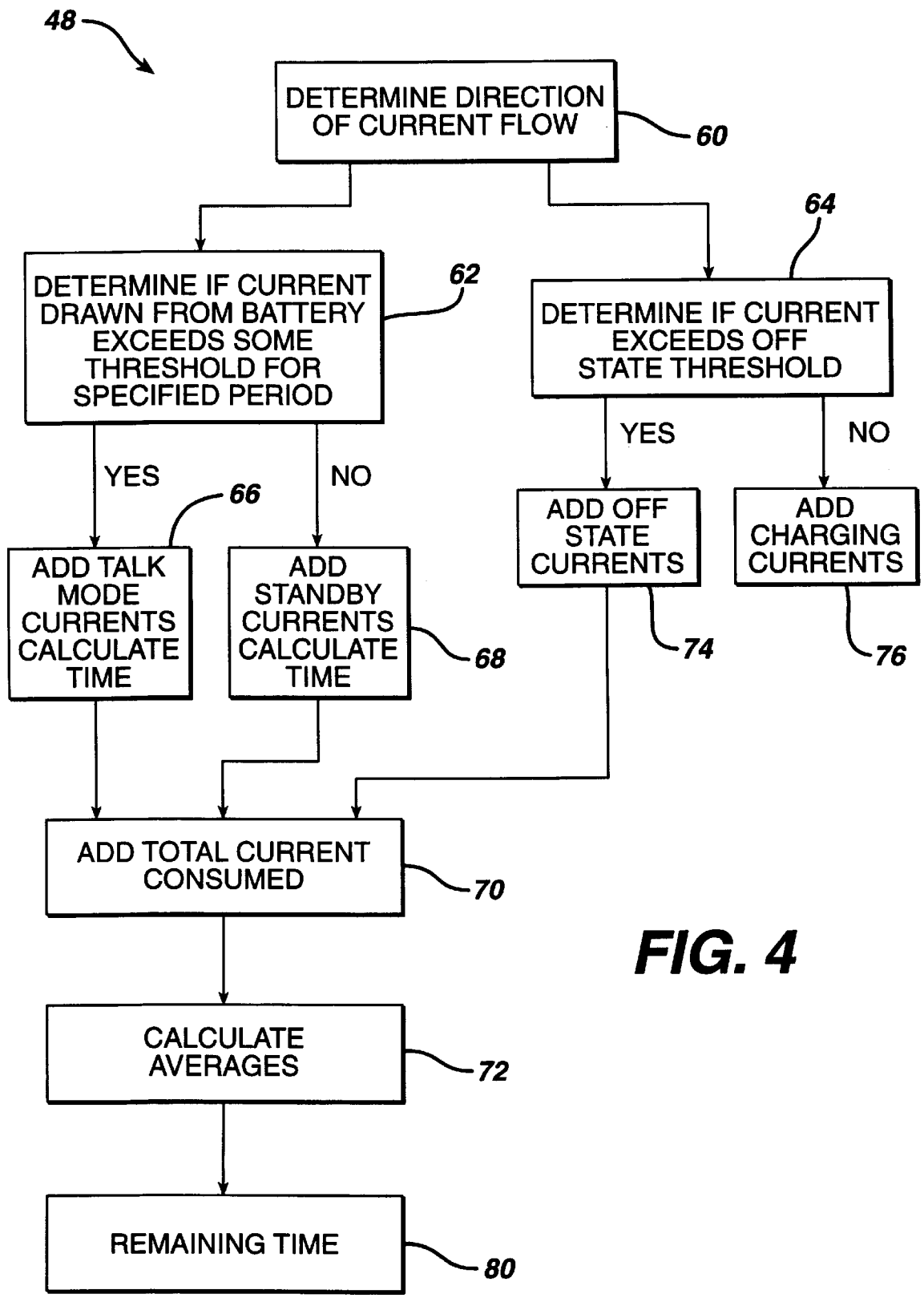
FIG. 4 is a flow chart showing a process for determining an operational mode of a battery.

Referring now to FIG. 4, the process 48 for determining the mode of operation of the battery 10 includes determining 60 a direction of current flow from the battery. The direction of current flow determines whether the battery is in a use or standby state, or in a charging state. If the direction of current flow is negative, i.e., the battery is being discharged, the process will determine 62 if the current being drawn from the battery exceeds some predetermined threshold for a specified period of time. Often batteries used in cellular telephones or video camcorders have maximum standby currents that can exceed the minimum use currents. Therefore, in order to provide accurate representations of the amount of time available in each mode, it is necessary to filter the current consumption and add current consumption to the proper mode. Therefore, the process 48 determines 62 the amount of current drawn from the battery over a specified period of time. This assumes that the peak currents are exceeded for a specified period of time in a "use" mode; whereas those peak currents are not exceeded over a long period of time during standby mode.

If the process determines 62 that the currents do exceed some threshold for a specified period of time, that indicates that the battery is in a "use" mode such as a "talk" mode for a cellular telephone. Therefore, the current consumed in the "use" mode, i.e., talk, is summed 66 with previous use currents and the time spent in that mode is also incremented. If the threshold was not exceeded for the specified period of time, the battery is in a standby mode and standby currents are added 68 and time in that mode is incremented.

If the direction of current flow was into the battery or if there is no current flow, those occurrences indicate that the battery is in an "off" state or a "charging" state. In the off state, the battery may still have a small negative current flow and such currents and corresponding times are added 74. The use or talk mode current, standby current and off state currents are added 70 to provide a total current that is used to calculate an average current 72.

The mode detection process 48 calculates 72 an average current by dividing total current by the total time in which the battery has been operated. The mode detection process 48 then calls a time remaining calculation process 80. The time remaining process 80 determines the amount of time remaining to fully discharge the battery or charge the battery depending upon the mode of operation, as determined in FIG. 4.

Several time remaining models may be used. One model is a floating average technique in which a moving average of current consumption is calculated separately for the current when the battery is in a "use" mode or a "standby" mode. One disadvantage with this approach is that since the process is a moving average, the amount of time to discharge may in fact go up when an average current value goes down relatively quickly. To dampen this effect, a non-floating average can be used in which the average current is updated over very large time intervals with actually learned values. This model provides a smoother output because the amount of current used in the calculations is constant during a calculation cycle.

An alternative model is a time count model. In the time count model, a time count register is decremented to count down the amount of time remaining in the time count register. This technique provides a precise count of time that the battery spends in the various modes.

Figure 5:
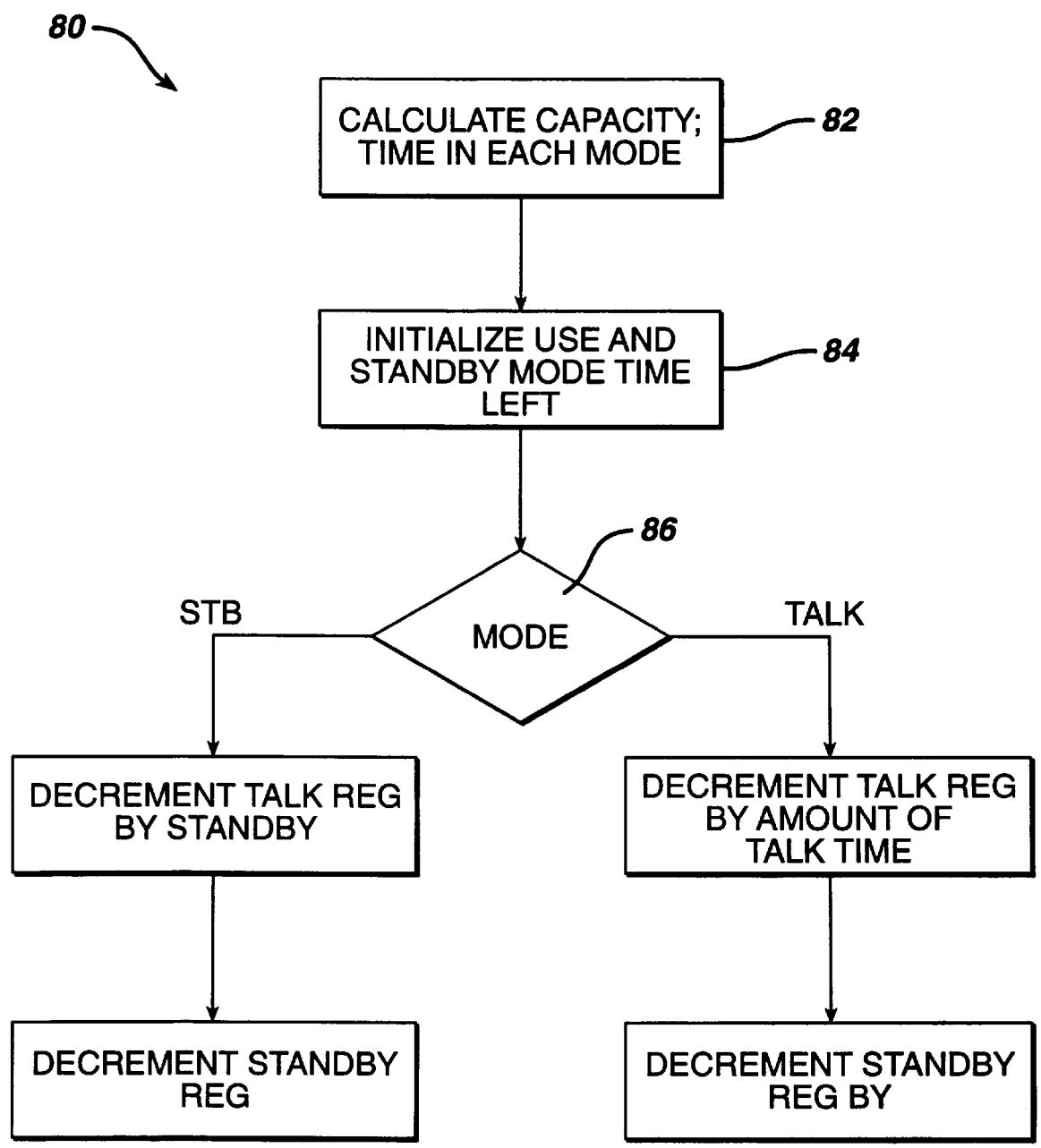
FIG. 5 is a flow chart showing a process for calculating capacity.

Referring now to FIG. 5, the time count model embodiment of the remaining time calculation 80 calculates 82 the remaining time to discharge the battery once per charging cycle and initializes 84 a pair "time remaining to discharge registers" (not shown) with the time value corresponding to the amount of time needed to discharge the battery in accordance with each mode such as "USE" e.g., talk and "STB" e.g., standby, as in Equations 1 and 2.

$$REMT, USE = CAP/Iavg, USE \quad \text{Equation 1}$$

$$REMT, STB = CAP/Iavg, STB \quad \text{Equation 2}$$

The remaining time is calculated 86 by dividing the capacity of the battery by the average current consumed per time period. The use and standby mode time registers contain the remaining time to discharge the battery in accordance with the mode. As a mode is determined 86, each mode register is decremented. Thus for the standby mode, the mode standby register is decremented as in Equation 3, and the use mode register is decremented as in Equation 4.

$$RemT, STB = RemT, USE - 1/\min \quad \text{Equation 3}$$

$$RemT, TLK = RemT, TLK - Iavg, STB/Iave, USE/\min \quad \text{Equation 4}$$

If the mode detected 86 is the use mode, the process decrements the standby register, as given in Equation 5 and decrements the use register by an amount of time, as given by Equation 6.

$$RemT, STB = RemT, STB - Iavg, USE/Iave, STB/\min \quad \text{Equation 5}$$

$$RemT, USE = RemT, USE - 1/\min \quad \text{Equation 6}$$

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A battery pack for a portable electronic device comprising:
   a case for carrying a battery, said case supporting:
      a charge sensing circuit, the charge sensing circuit producing a discharge signal corresponding to a measurement of an amount of charge removed from a battery;
      a processor responsive to the discharge signal from the charge sensor circuit to produce a signal corresponding to an amount of time prior to discharge of the battery based on a current rate of discharge of the battery; and
      a display responsive to the signal corresponding to the amount of time to discharge the battery, configured to display a time period corresponding to the amount of time to discharge the battery based upon the current rate of discharge of the battery.

2. The battery pack of claim 1 wherein the sensor circuit is a charge sensor circuit that measures the amount of charge removed from the battery.

3. The battery pack of claim 1 wherein the sensor circuit is a Coulomb counting circuit that counts an amount of charge units removed from the battery.

4. The battery pack of claim 1 wherein the display is a low power display.

5. The battery pack of claim 1 wherein the display is a liquid crystal display, an electrophoretic display or an electronic ink display.

6. The battery pack of claim 1 further comprising at least one battery cell carried within the case.

7. The battery pack of claim 1 wherein the charge sensing circuit produces a charge signal corresponding to the amount of charge fed to a battery during a charging mode of operation.

8. The battery pack of claim 7 wherein the processor is responsive to the charge signal and produces said signal corresponding to an amount of time prior to discharge based on the charge signal and the discharge signal from the charge sensor circuit.

9. The battery pack of claim 1 wherein the processor produces a signal corresponding to a message that indicates a mode of operation of the battery and the message is displayed by the display device.

10. The battery pack of claim 9 wherein the message corresponds to an operation mode or a standby mode.

11. The battery pack of claim 1 wherein the battery pack further comprises:
   a battery and the charge sensing circuit and processor derive a power signal from the battery.

12. A battery pack for a portable electronic device comprises:
   a case carrying a battery, the case supporting:
      a charge sensing circuit to produce an electrical signal corresponding to a measurement of an amount of charge removed from the battery;
      a processor responsive to the electrical signal from the charge sensor circuit to produce a signal corresponding to an amount of time prior to discharge of the battery in accordance with a history of operation of the battery; and
      a display, responsive to the signal indicating the amount of time prior to discharge, to display a time period corresponding to the amount of time to discharge the battery based upon a current mode of operation of the battery.

13. The battery pack of claim 12 wherein the sensor circuit is a charge sensor circuit that measures the amount of charge removed from the battery.

14. The battery pack of claim 12 wherein the sensor circuit is a Coulomb counting circuit that counts the amount of charge removed from the battery.

15. The battery pack of claim 12 wherein the display is a liquid crystal display, a light emitting diode display, an electrophoretic display or an electronic ink display.

16. A method of indicating time remaining to discharge a battery contained in a battery case, the method comprising:
   measuring and accumulating an amount of charge removed from the battery;
   determining the time remaining to discharge the battery from the amount of accumulated charge removed from the battery; and displaying, on a display carried by the battery case, a time period corresponding to the amount of time to discharge the battery.

17. The method of claim 16 wherein the time displayed is based upon a current mode of operation of the battery.

18. The method of claim 16 wherein measuring and accumulating an amount of charge removed from the battery takes into consideration charge removed during operation, standby and quiescent periods.

19. A method of indicating time remaining to charge a battery contained in a battery case, the method comprising:

measuring and accumulating an amount of charge inserted into the battery during charging of the battery;

determining the time remaining to charge the battery from the amount of accumulated charge inserted into the battery; and displaying, on a display carried by the battery case, a time period corresponding to the amount of time to charge the battery.

20. The method of claim 19 wherein the time displayed is based upon a current mode of operation of the battery.

* * * * *